(12) United States Patent
Hampel et al.

(10) Patent No.: US 8,462,041 B2
(45) Date of Patent: Jun. 11, 2013

(54) DEVICE FOR RECEIVING SECONDARY RADIO SIGNALS WITH QUASI-DYNAMIC OR DYNAMIC SECTORING OF THE SPACE TO BE MONITORED AND CORRESPONDING METHOD

(75) Inventors: Hermann Hampel, Grosshabersdorf (DE); Ulrich Berold, Nuremberg (DE); Gerd Bumiller, Furth/Vach (DE); Christoph Reck, Erlangen (DE)

(73) Assignee: iAd Gesellschaft für Informatik, Automatisierung und Datenverarbeitung mbH, Grosshabersdorf (DE)

( * ) Notice: Subject to any disclaimer, the term of this patent is extended or adjusted under 35 U.S.C. 154(b) by 47 days.

(21) Appl. No.: 13/131,669

(22) PCT Filed: Nov. 27, 2009

(86) PCT No.: PCT/EP2009/008552
§ 371 (c)(1),
(2), (4) Date: Nov. 16, 2011

(87) PCT Pub. No.: WO2010/060651
PCT Pub. Date: Jun. 3, 2010

(65) Prior Publication Data
US 2012/0092211 A1    Apr. 19, 2012

(30) Foreign Application Priority Data
Nov. 27, 2008 (DE) .................. 10 2008 059 424

(51) Int. Cl.
*G01S 13/00* (2006.01)
(52) U.S. Cl.
USPC .................. 342/32; 342/29; 342/30; 342/175
(58) Field of Classification Search
USPC .................... 342/29–32, 42–51, 175
See application file for complete search history.

(56) References Cited

U.S. PATENT DOCUMENTS

| | | | | |
|---|---|---|---|---|
| 4,789,865 A | * | 12/1988 | Litchford | 342/455 |
| 4,910,526 A | * | 3/1990 | Donnangelo et al. | 342/455 |
| 5,075,694 A | * | 12/1991 | Donnangelo et al. | 342/455 |
| 6,344,820 B1 | * | 2/2002 | Shiomi et al. | 342/174 |
| 6,985,103 B2 | * | 1/2006 | Ridderheim et al. | 342/30 |
| 7,453,923 B2 | * | 11/2008 | Leblond et al. | 375/148 |
| 8,253,622 B2 | * | 8/2012 | Hampel et al. | 342/147 |
| 2004/0234016 A1 | * | 11/2004 | Leblond et al. | 375/350 |
| 2005/0024256 A1 | * | 2/2005 | Ridderheim et al. | 342/29 |
| 2006/0055586 A1 | * | 3/2006 | Kuji et al. | 342/32 |

FOREIGN PATENT DOCUMENTS

| | | |
|---|---|---|
| WO | 2005/010553 A1 | 2/2005 |
| WO | 2009/106320 A1 | 9/2009 |

\* cited by examiner

*Primary Examiner* — Jack W Keith
*Assistant Examiner* — Peter Bythrow
(74) *Attorney, Agent, or Firm* — Rankin, Hill & Clark LLP

(57) ABSTRACT

A device and method for secondary radar signal reception with quasi-dynamic or dynamic sectoring of a space to be monitored. The device includes at least one antenna assembly including antenna elements for the reception of transmitted secondary radar signals, a signal processing unit connected via a connection point to the antenna elements for the joint processing of received antenna signals, outputs associated with a couple matrix in the signal processing unit and individual receivers. The couple matrix includes adjustable coefficients for sectoring of the space to be monitored and for performing a superposition of the antenna signals using a multiplicative-additive combination of the received antenna signals. In the case of dynamic sectoring of the space, each receiver receives for each receipt telegram another weighted superposition of the antenna signals with certain couple coefficients, and in the case of quasi-dynamic sectoring the adjustable coefficients are fixed over a longer time period.

18 Claims, 7 Drawing Sheets

Figure 1:
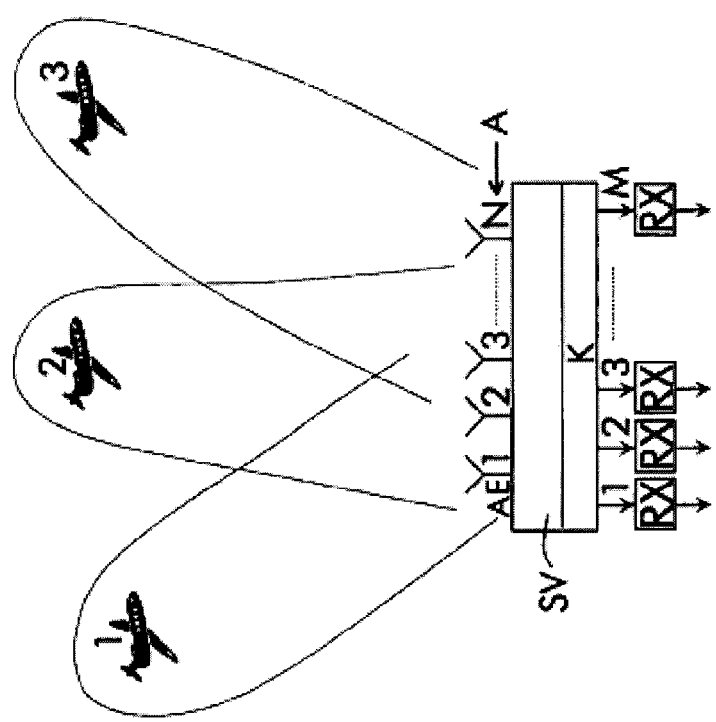

DEVICE FOR RECEIVING SECONDARY RADIO SIGNALS WITH QUASI-DYNAMIC OR DYNAMIC SECTORING OF THE SPACE TO BE MONITORED AND CORRESPONDING METHOD

The invention refers to in accordance with Claim 1 a secondary radar system with quasi-dynamic or dynamic sectoring of space to be monitored and Claim 12 for related method.

The term primary surveillance radar stands for surveillance radar facilities which convert the radar principle exclusively, and more directly, analyze the immediate (passive) echo by high frequency transmitted impulses. The term is used to distinguish secondary surveillance radar that is equipment actively utilizing the echo created by objects in range. In practice, the two methods are often used in combination (e.g. in flight safety in a ground surveillance radar). Primary surveillance radars (PSR) are not designed to get signals from an object that is actively generating such signals. This is important in the sphere of flight safety in view of the fact that an aircraft should be detected even when the flight transponder is not functioning. Primary surveillance radars are able to safely change frequency if the frequency in use is garbled. The secondary surveillance radar (SSR) is able to successfully implement such a change only if the object has also conducted a frequency change. The primary surveillance radar is able to find only quantities determined by the reflecting echo (e.g. flight course, distance and speed), while a secondary surveillance radar facility's receiver is able to integrate a wider set of data into its response (e.g. identification). The primary surveillance radar facilities require quite higher transmission power to cover an operating range comparable with that provided by secondary surveillance radar facilities.

The principle of the secondary surveillance radar facility is a localization method measuring the time for passage, which, unlike the traditional radio equipment, does not operate with the target-reflected energy, neither with the target's passive echo, unless there is an active response device (transponder) is on board. In the case of the secondary surveillance radar facility, the targets actively respond to the received radar facility signal through responding at the same or another frequency. Furthermore, the radar pulse is received through an antenna and is released from the characteristic "echo" over the same antenna. This response can be a characteristic modulation or a data set. The secondary surveillance radars outclass the primary ones in providing significantly wider radius as well as in their ability to identify the targets. The primary surveillance radar provides reliable information on target's flight course, altitude and distance while this information is provided regardless of the target. The secondary surveillance radar facility provides additional information like target recognition, identification and eventually target's altitude. Of course, target's cooperation is also required. The secondary surveillance radar is unable to operate and will not identify the flying object if such a cooperation is lacking; due to a faulty transponder, for example. Therefore, most secondary surveillance radar operate concurrently with primary surveillance radars. International standard Mark X has been laid out in 1953 (this system has been structured in a very simple way at that time and has been operating within the 950 MHz to 1150 MHz frequency range at 12 with a frequency range of 17 MHz) and many additions has been made to define it as a basis for civil use of secondary surveillance radars in flight safety by 2008. Terms Super Beacon and Discrete Address Beacon System (DABS) are used in older literature as former denotations of type C operation in Mark XII standard.

As a rule, the secondary surveillance radar is made up of two devices: A rivet setup (interrogator) and a responding device (transponder). Airline rivet installations are partly ground transmitters while rivet installation can also be deployed partly like aircraft transponders. The interrogator sends an sample coded inquiry that depends on the respective modulation type (the so called type) through different pulses. These pulses are received and assessed by the transponder. A response is generated, re-coded and transmitted once the inquiry is assessed. The distance between the responding device and the rivet installation can be calculated through measuring the time needed to deliver the pulses and get a response cable. This calculation is correct only if the additional delay time caused by the transponder's coding and decoding operations is known.

In the case of protocol for transmitting of the so called Uplink-track/course (an inquiry from a ground transmitter to an aircraft), which, in general, is sent on 1030 MHz, one should distinguish simple inquiries (A type and C type) from selective inquiries (S type), in which pulse modulation with differentiated phase manipulation (DPSK) is used within the framework of P6-pulses. The response cable, transmitted at 1090 MHz, is 20.3 µs-long for simple types (A and C), is made up of 2 to 15 pulses of with pulse length of about 0.45 µs (±0.1 µs) and has only one set of values from 4,096 different identification codes (A type) through the four-positions octal code used; and flight altitudes (C type), respectively. For the receiver to recognize the two frame pulses F1 and F2 as a valid response these pulses should be at an interval of 20.3 µs, at least. This equals a 3-kilometer distance in the wave dispersion. There are a total of 13 positions for the coding pulses within the 1.45-µs interval between the frame pulses. Of them, only a maximum of 12 positions are used to send the desired information in octal code in types A and C. The three blank positions can be left unmarked by an pulse because some decoders reject the general response, interpreting it as a violation. The response cable does not contain information on the type. The secondary surveillance radar decoder always presumes that the response received fits the last sent inquiry type. The pulses between the frame pulses bear the code that contains the desired information as an octal code, depending on the inquiry type. Through the number of 12 possible pulses, the set of values is limited to 4,096 and to single-digit information. In addition to the 12 information pulses, the so called SPI-pulse (Special Purpose Identification) can be used in flight safety to markedly underscore the identification response received by the air-traffic controller. The pilot presses a button next to the transponder's panel on request by the ground crew and then the SPI-pulse is added to the response cable for a certain time period (duration is 18±1 s). Some problems in the general processing occur due to the historically selected position outside the frame pulses. According to the ICAO, the SPI-pulse is generated only in Type A responses.

In contrast to the Type A/C responses, the response to Type S selective inquires contains a larger amount of information which is transmitted in the form of pulse positional modulation (PPM). It is not advantageous to use differentiated phase manipulation in the Downlink-response from the aircraft to the interrogator, like in the Uplink, for the transmission safety will be affected by the extreme temperature fluctuations experienced by the transponder during high-altitude flight. Transmitting Type S transponders are characterized by the so called Squitter-type, in which, regardless of the inquiry, the transponder independently and regularly broadcasts as a radio-message (ADS-B Automatic Dependent Surveillance—Broadcast) its GPS-position and ID mark, for example.

In the secondary surveillance radar equipment, the term "Garbling" is used to depict only particular receiving faults. It refers to overlapping of transmissions by two or more transponders, allowing falsification of information concurrently received from them. If two or more flying targets, with a radial distance lower than 3 kilometers, are within the reception range of a precisely focused receiving radar antenna, then the Type A/C response cables partially flow into each other. Alterations in receiving ADS-B-cables (Type S) are even more common because transponders temporarily broadcast in an uncoordinated manner, on the one hand, while, as a rule, poorly focused or non-focused antennas are used, increasing the number of possible transponders within the direction diagram of the receiving antenna, respectively.

One speaks of an asynchronous Garbling if two transmissions are overlapping in a way where their time differences are not completely identical. Such transmissions can often be decoded independently and separately, leastwise in Type A/C. If two transmissions are overlapping in way where they have a common time difference, it is a synchronous Garbling, though. During decoding, it is impossible to determine whether a particular pulse belongs to the one or the other, or to the both cables. Therefore, a completely new and false cable have to be decoded that is not completely unrelated to the initial transmission, so this polysemantic/multi-ciphered cable should be blocked. In conclusion, the SPI pulse can be received twice in Type A/C as well as in a situation where a correct C2-response is available. This particular case is called "Scheingarbling".

Process of distinguishing false; respectively, polysemantic/multi-ciphered cables from the correct ones is called "Degarbling". The issue with Degarbling is in identifying code-able and non-code-able Garbling forms. Mechanism for efficient use of the receiving signal, which as a rule is the strongest signal received, through selection of faulty signals and their reduction, respectively; is described in the RTCA-Standard DO-260A standard with examples provided for a secondary surveillance radar receiver (Type S/ADS-B), and is explained for a case with one channel between a sender and a recipient, i.e., using only of a transmitting and a receiving antenna. Special schemes for decoding of Garbling are introduced to identify and process the depicted cases of Garbling, respectively.

For example, in Type A/C, the technical implementation in these schemes is achieved through storing of the sample pulses received and comparing them to the frame pulses. Retention lines with 1.45-μs deflections (response pulses difference time) that are needed in Garbling's decoding scheme can also be materialized as a shifting register. The overall process can also be implemented in a processor-managed scheme or as a program. Functioning comprises the following processing steps: initial identification of frame pulses through the first retention line; retention of identified frame pulses through a second retention line during the second processing step; during the third processing step, a test is conducted whether frame pulses are overlapping (for example, through a third retention line or a subsequent logical disunction—OR), and, last, if nothing is identified (a 15.95-μs time), decoding release. This very time is not used if Scheingarbling occurs.

Phased-Array Antenna (phase-managed field antenna, these are group antenna featuring highly directed operation, which direct the energy emitted through transposition and shifting of single transmitters) are often used in secondary surveillance radars in flight safety for reducing alteration probability (i.e. as a variant of Garbling decoding). Single spatial direction guidance is so stronger as wider is the cross-extension of antenna in this direction. Therefore, radar antenna are placed horizontally, as a rule; in order to achieve direction in the horizontal direction diagram. Interaction is important for the operating principle of these antenna i.e., the phase-dependent overlapping of two (or more) transmissions. Furthermore, one can observe that identical-phase signals are amplified, while opposite-phase signals delete each other. Hence, if two transmitters transmit a signal in the same time, then a transformation is materialized: The signal is amplified in the main direction and is reduced in the side directions. If individual transmitters are managed in a different way i.e., for example, the signal of one of these (e.g. the lower one) transmitters is transmitted 10° phase-shifted (hence, earlier) compared to the signal by the (e.g. the upper) transmitter, the main direction of the common signal transmitted is shifted (e.g. upwards), respectively. If the phase-shifted management of a single transmitter is electronically changed, then antenna's antenna diagram is also fluctuating.

Hence, the antenna with a phase-managed field uses phase shifting of matrix-arranged transmitting elements to materialize control through interference. Direction diagram can be asymmetrically influenced through purposeful fluctuation in phase's regime, e.g. to restrict downward a seeking radar featuring also diagonally up-placed direction diagrams. Therefore, phase angle of lower elements should be moved earlier while upper elements' phase should be moved later, respectively, to move transmission angle/receiving angle upwards. A phase difference results in no energy in the lower transmitter in the middle of the antenna while a wider upper uniformity of the phase and the upper transmitter energy is achieved. This way, wave front facing antenna's space lessens and transmission angle inclines upwards. Phase difference between transmitters is constant between antenna elements and one should pay attention to eventual differences in input phases.

Direction of the entire antenna is changed i.e. the form of antenna's diagram is changed if a different phase differentiation is defined, e.g. outside elements' phase angle is regulated and presented with internal elements. This method is used in the multitype surveillance radar to switch over from a wide target-seeking diagram to a narrow precise target-tracking diagram.

Many single transmitters are required for a very narrow antenna diagram, while their phase differentiation between transmitters is added to antenna group's contour. Phase-changing devices should achieve a 360° move of the phase. For example, different outflanking lines, which are connected in 22.5°-steps to the power line in the case of 4-byte phase-changing device, are utilized in everyday use. In theory, transmission angle can total almost ±90°. However, it is not exceeding ±60°, as a rule, because antenna diagram control worsens if transmission angle is grows in value. In everyday use, three antenna groups are allocated at 120° for search within the full range around the antenna. Four groups at 90° are more efficient as used in the APAR, a sea surveillance radar device, for example.

Unspecified antenna designs can be used as single transmitters in one antenna field. In an antenna with a phase-controlled field, it is crucial the single transmitter to be controlled through a certain phase-change that alters transmission's main direction. To achieve both vertical and horizontal direction, multiple transmitters are used in a large antenna field. For example, antenna of RRP-117 is made up of 1,584 transmitters. Advantages of rotating radar antenna include: First, much more advantageous implementation from a financial viewpoint (without rotational mechanical load and related expensive atmospheric protection); as well as flexible and rapid adjustment of actual incidence angle, for no mechanical control is required because it is made entirely electronically.

Direction diagram's deflection that depends on the frequency is a special case of an antenna with a phase-controlled field where direction diagram's deflection is entirely controlled without a phase-changing device, through transmitting frequency and direction diagram's deflection derives from the frequency. For example, a vertical antenna group is controlled in series and all transmitters have equal phase power at the main frequency through identically designed retention lines that cause a 360° phase-change. Hence, all transmitters transmit concurrently at an identical phase and resultant transmission is consequently vertical to antenna's levels. Furthermore, if the transmission frequency is decreased by a smaller percentage, the designed outflanking line length is no more defined because the outflanking line is too long this way. Transmitter-to-transmitter phase change occurs, where the first transmitter transmits this smaller percentage earlier than next adjacent transmitter and so much longer that resultant transmission to increase.

As a rule, precisely directed antenna cannot be used to receive Squitter-telegrams because usually it is unknown when an aircraft sends, as well as from which receive direction to expect a signal, which makes impossible to precisely orientate a very narrow antenna diagram. Such being the case, Garbling can be decoded using sector antenna that divide total monitored space to smaller sectors (as a rule, 4 to 12). Thus, a reduction of transformation changes in the individual sectors is realized. As a rule, mechanical, hard-leveled directed antennas are used in the realization of sector antennas.

Moreover, a trend to increase transmission output through a signal transmitted by multiantenna systems exists in the field of communications equipment. Initially, formulations related to keywords SDMA (Space Division Multiple Access) and MIMO (Multiple Input Multiple Output) were aimed at creating focus on a certain space sector in more adjacent receive units through related signal processing by more antenna. Meanwhile, most specialists tend to use other ways; respectively, study the main formulation applying other optimization criteria, therefore, getting another data interpretation where optimization is no more materialized by geometrical sector division but with a view to errors/faults frequency minimization.

Depending on the state of equipment, the following issues and problematic situations can occur in secondary systems:

The growing number of senders (aircraft) in the monitored space also increases probability for transmissions conflict to occur where multiple senders transmit to a single receiver. On one hand, this probability grows once more if every transponder can receive much more than one or several interrogators and respond to them, where transponder's transmission frequency increases significantly. Squitter-transmissions that are facing responds (e.g. for ADS-B) once again increase transmission frequency. If more transponder transmissions enter the receiver this way, they result in faulty individual data packets or identification mainly of the strongest receive signal, at the best.

Another issue is related to a repeated receiving through reflection of transponder's signal from various objects, which can cause unfavorable transformation of different circuits/lines/chains in the receiver (direct chain and/or reflection chain(s)). Thus, strong signal alterations and even loss of signal can appear. This occurs especially on the territory of airfields, close to airfields, respectively, where multiple reflecting objects are closely adjacent to direct link between the sender and receiver.

EP 1 953 565 A1 demonstrates a secondary control radar system and respond analysis operation for the secondary control radar system, where ability for removal of Type A/C-target reports is improved, based on different types. Types are divided into Type A, Type C, and Type S. Type A is intended for information containing aircraft's identity, while Type C is used in receiving information on the altitude. Type S has an individual selectively calling function with an ID (identification, 24-byte address) that is assigned to every aircraft. In addition to aforementioned information types (identity information and altitude information), information on distance traveled and speed can be obtained through Type S. The secondary control radar system identifies an aircraft, by transmitting an inquiry to the transponder that is installed in the aircraft, receiving responds that correspond to the inquiry and analyzing responds' content. Besides, the secondary control radar system features ground-mounted rivet system and antenna that is rotating horizontal at 360 degrees, while a transponder and an antenna are installed in the aircraft, according to the EP 1 953 565 A1. The antenna assembly comprises transmission unit, receive unit, processing unit and a mixer. Transmission and receive units are connected to the ground antenna while signal processing unit is connected to transmission unit and receive unit. One inquiry cycle by the antenna assembly comprises five different inquiries and transponder sends back relevant receipt telegrams to these inquiries. These receipt telegrams are received by the antenna and delivered by the receive unit. Signal processing unit that is connected to it interprets the content of every receipt telegram and creates Type S target-report and Type A/C target-report based on this assessment. If an aircraft can be identified through a Type S target-report, the mixer re-transmits a Type A/C target-report (in assessment of cross-relations concerning the position and present flight progress) that is related to the aircraft which is identified.

Furthermore, we know from the US 2004/0234016 A1 an operation and an Antigarbling-device in receiving wide-range/band radio signal, particularly a GPS-signal, during which operation signal's space filtering is conducted through a space mixer that generates a significant amount of varying in amplitude and signals' phase transmitting elements of the antenna. In particular, the operation used there is based on the CSLC-Antigarbling-method with static positioning of different independent receive lines of transmitted elements, selection of receive lines (main and auxiliary line), and dynamic influence over the so called "degarbled" receive line, i.e. linear combination of auxiliary receive lines' signals, whose amplitude and phase are assessed with the help of dynamic regulated coefficients, is added to the main receive line. The CSLC-Antigarbling-equipment output depends on calculation accuracy and determination of coefficients (amplitude and phase assessment). In an object at US 2004/0234016 A1 a special test signal generator is envisaged, which is calibrated and generates at least two test signal versions, mainly a stretched test signal and a receiving group antenna with parallel processing circuits. Dimensional Antigarbling-filter implements a linear combination of the signals received by different transmitting antenna elements. Its operating cycle is based on the assumption that effective and faulty signals are not received from the same direction. An issues raised by the CLSC-equipment in the field of radar equipment, is determination of coefficients of dimensional Antigarbling-filter within the wide-range/band effective (stretched wide-band signal), because the parallel identical processing circuits, which deliver the signals by the main receipt line auxiliary receive lines signals are very precise. The problem is resolved through the test signal generator which is connected to a set of automatic alteration jacks (alteration jack's regulated filter that is programmed by a digital filter), as well as two spectral analyzers where the reading device of the measured transmission function is removed. Furthermore, in the course of the operation, databases of the automatic alteration jack are envisaged to be calibrated through quasi-dynamic binary codes as a test signal, which is orthogonal to quasi-dynamic binary codes used in the GPS-system.

Finally, from the US 2006/0055586 A1 a secondary surveillance radar system is known, featuring transmitting device for inquiry signals, receipt telegrams receiving device, and a processing unit, where the preset angle field of transmitting inquiries is comparable to the antenna's transmitting width (diagram of the antenna), and where during every so called roll-call inquiry periods towards the azimuth are reduced, allowing to receive receipt telegrams. Moreover, the processing unit compares transmitting width of the antenna with envisaged position areas, continues sending selective inquiries during every roll-call-period, provided that envisaged position areas are narrower than transmitting width and reduces selective inquiries during every roll-call-period provided that areas of angle envisaged are wider than transmitting band. The inquiry cycle for one transponder of the ATCRBS (air traffic control radar beacon system) is envisaged to be divided into two periods (for ATCRBS and Type S receipt telegrams), especially for the angular areas for inquiry transmission to varry according to the presets. Besides, the work load time of the radio channel increases when targets are localized at short distances in Type S SSR because areas of the azimuth angle for message transmission widens. Furthermore, highest priority is assigned according to the azimuth angle message transmission areas within the antenna's transmitting band while the second priority is assigned according to the targets in the distant area. Thus, inquiry radio channel's workload can be reduced.

As a rule, as demonstrated by the aforementioned state of equipment assessment, target identification in the known secondary surveillance radar systems is based on adequate analysis of received secondary radar signals of different types i.e., on identification of code-able and non-code-able Garbling variants (receive faults/alterations) during receipt telegram's assessment. Moreover, radar control on commercial airlines is conducted through rotating control antenna, while reception of Squitter-transmissions is implemented through antenna or mechanical fixed sector antenna. Military radar equipment includes also mechanical fixed multi-antenna systems where the input angle is not set through mechanical limitation and rotation but through phase-control over individual antenna signals where phase-changing electronic devices are used to adapt phases to I-IF-signals. Control is conducted in a way that resultant characteristic of the "common antenna" to always focus only the positive area of input angle through adjusted transformation of individual antenna's signals, causing electronic rotation of "direction diagram". Related to this application is the radar-guided target tracking, for example, e.g. in missiles. Antenna bars are also set, and only one Beam is used in one object i.e. no multi-beam antenna are used, as a rule. Advantages of rotating radar antenna compared to conventional ones include: First, advantageous implementation (without mechanical load through rotation and related atmospherics protection), as well as flexible and rapid regulation of actual input angle for no control is required because it is conducted entirely electronically.

It is an object of the invention to configure a secondary surveillance radar system, respectively secondary radar signals receive device, in such a manner, allowing better separating of objects, especially where a large number of objects in the monitored space exist, as well as to achieve higher level of robustness to interfering signals and multipath propagation.

In the following (description and claims), both inquiry responds and Squitter-transmissions are considered transmitted secondary radar signals.

This problem is solved according to the invention, in the case of a device for reception of secondary radar signals with quasi-dynamic and dynamic sectoring of controlled space, according to patent claim 1 in that said device comprises:
  at least one antenna assembly comprising N antenna elements for the reception of transmitted secondary radar signals,
  a signal processing unit connected with a connection point of the respective elementary antenna and having a couple matrix with adjustable coefficients for sectoring of the space to be monitored performing a superposition of the antenna signals by means of a multiplicative additive combination of said received antenna signals and
  at least one receiver connected with said couple matrix, wherein according to a dynamic sectoring of the space each receiver receives for each receipt telegram another weighted superposition of the antenna signals with certain couple coefficients, whereby in the quasi-dynamic case the adjustable coefficients are fixed over a longer time period.

Furthermore, the problem is solved according to the invention, in the case of a method for the quasi-dynamic or dynamic sectoring of the space to be monitored using a device for the reception of secondary radar signals comprising at least an antenna assembly comprising N antenna elements for the reception of secondary radar signals of objects, a signal processing unit with a couple matrix connected to said antenna assembly and at least one receiver connected to said couple matrix, according to patent claim 12 in that said method comprises:
  determining of coefficients of the couple matrix quasi dynamic by setting of parameters or dynamic in the operation mode and in accordance with condition of the useful signal of an interesting object in a sector and/or by consideration of optionally present interfering signals and
  making available to the receiver by the couple matrix in each case one with a certain couple coefficient weighted superposition of the signals by means of a multiplicative additive combination of said received antenna signals, whereby in the dynamic sectoring of the space to be monitored the receiver m can receive for each receipt telegram another with certain couple coefficient weighted superposition of the antenna signals and whereby in the quasi-dynamic case the adjustable coefficients are fixed over a longer time period.

According to the invention, the device for receipt of secondary radar signals, respectively the secondary surveillance radar system with a quasi-dynamic or dynamic sectoring of controlled space, respectively the method, according to the invention, the central processing unit corrects antenna signals through a couple matrix and delivers to the receiver receipt telegram with certain couple coefficient and weighted superposition of the antenna signals. In the traditional individual antenna systems, the signal transmitted to individual receipt units can be processed equally by them. Therefore, in the secondary surveillance radar systems, according to the invention, are further used in a favorable manner the present individual channel receivers and set algorithms, respectively. As a rule, every receiver gets another combination of couple coefficients, and in this way individual receivers can be optimized for different transmitters or receipt characteristics (Beams). In particular, dynamic adjustment to receiver characteristics is especially advantageous due to constantly changing position of transmitters (aircraft). This is not explicitly required, for couple coefficients can be applied also only once and statistically (quasi-dynamically) set later. This simple variant of the invention is comparable in terms of costs to the electronic realization of most fixed sector antenna.

Coefficients are selected in such a manner that for each receiver a certain sector of the space to be monitored (also Beam) becomes focused. The sector is either a single continuous space or a combination of several spaces. If adaptation of Beam-forms (through coefficient adaptation) is made dynamically in the operation, they can always be adapted to actual requirements and actual situations, respectively.

Mainly, the optimization of a beam is made in such a manner that the maximum of the beam lies over the interesting object (for all receivers). Furthermore, optimization of a Beam can be made mainly in a manner that for (all receivers) the zeroes of the beam are placed over objects to be selected. In a wider implementation, optimization of a Beam can be implemented over either selected targets (maximum over interesting object and zero over selected objects). These optimization options can be advantageously used when information on positions of other objects is available (e.g. transponders of other aircraft), due to the fact that these positions change relatively slow compared to the elevation angle. Further, positions are easily predicted in the short-run through tracking objects' lines (trajectories) due to continuous objects movement.

On the one hand, mainly fixed sectors are formed while sectors are introduced according to actual requirements, on the other hand. High reliability (i.e. consequences arising from possible faulty dynamic sector/coefficient selection can be reduced through additional stable sectors) is achieved through this combination, in addition to high system dynamics (through dynamic optimization related to the maximum and/or zero as described above).

The combination of the signals associated to the antenna takes place in the signal processing unit on basis of ECB signals (ECB: Equivalent Complex Baseband) or HF-signals (HF: high frequency) or ZF-signals (ZF: intermediate frequency). Direct superposition of a high-frequency signal (without mixer) can be implemented in the scope of the invention. Primarily in the central processing unit a combination of antenna signals is made, but which are ECB signals. The advantage is that ECB-signals allow compact digitalization and, therefore, technical realization of required signal processing is simple.

A further development of the invention, according to Patent claim 7, is characterized by an antenna assembly that is formed as a linear or circular array or as a matrix arrangement.

This improvement of the invention, unveils an advantage related to the fact that in simple geometrical constructions, especially for the fixed sectors, coefficient calculation is particularly simple because calculation can be made in a geometric way. In principle, the invention is applicable in unspecified antenna assembly.

A further development of the invention, according to Claim 8, is characterized by an antenna assembly that is formed with antenna elements in multidimensional arrangement to each other.

Such a design of the invention has the advantage of a facilitated detection of distant objects in the receiver, in particular, and especially in case of Garbling, because signal strength depends on distance. According to the invention this concept is treated as a "space Degarbling" because dimensional separation of the signal and reception of signals, as well as reception of weaker signals (hence, not only the strongest signal) in the receiver is possible.

Another development of the invention, according to claim 9, is characterized for sectoring of the space both in horizontal and in vertical sectors the antenna assembly is performed with horizontal and vertical arranged antenna elements.

Space is divided into both horizontal and vertical dimensional sectors, while vertical separation is performed taking into account different elevation angles (→horizontal and vertical sectors). Flight altitudes are often quite identical (airline altitudes) and this allows a facilitate separation of objects that are located at different distances to the receiver.

Another development of the invention, according to claim 10, is characterized for the subsequently integration in existing systems with single channel receivers the respective signal path between antenna and receivers is separated and the signal processing unit is intermediated, thus the preprocessing of the supplied antenna signals and the division in sectors is realized by the application of the couple matrix and the disposal again of the resultant signals to the single channel receivers.

This improvement of the invention can be easily realized because the associated multi-antenna processing does not lead to obligatory adaptation of processing/algorithms of individual channel receivers. In this improvement, calculation amount for processing of individual sectors arise not central since calculation load is again divided over individual channel receivers.

Figure 3:
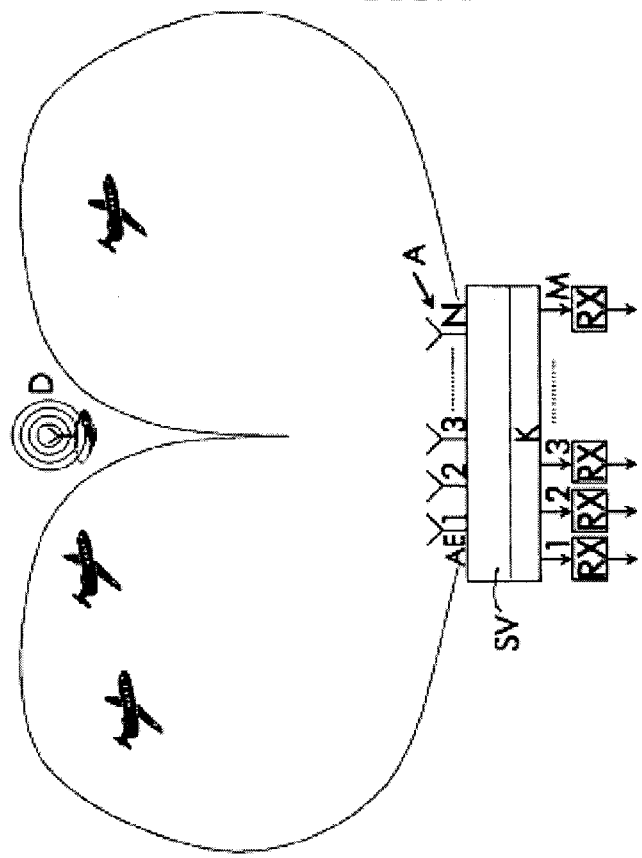
Figure 2:
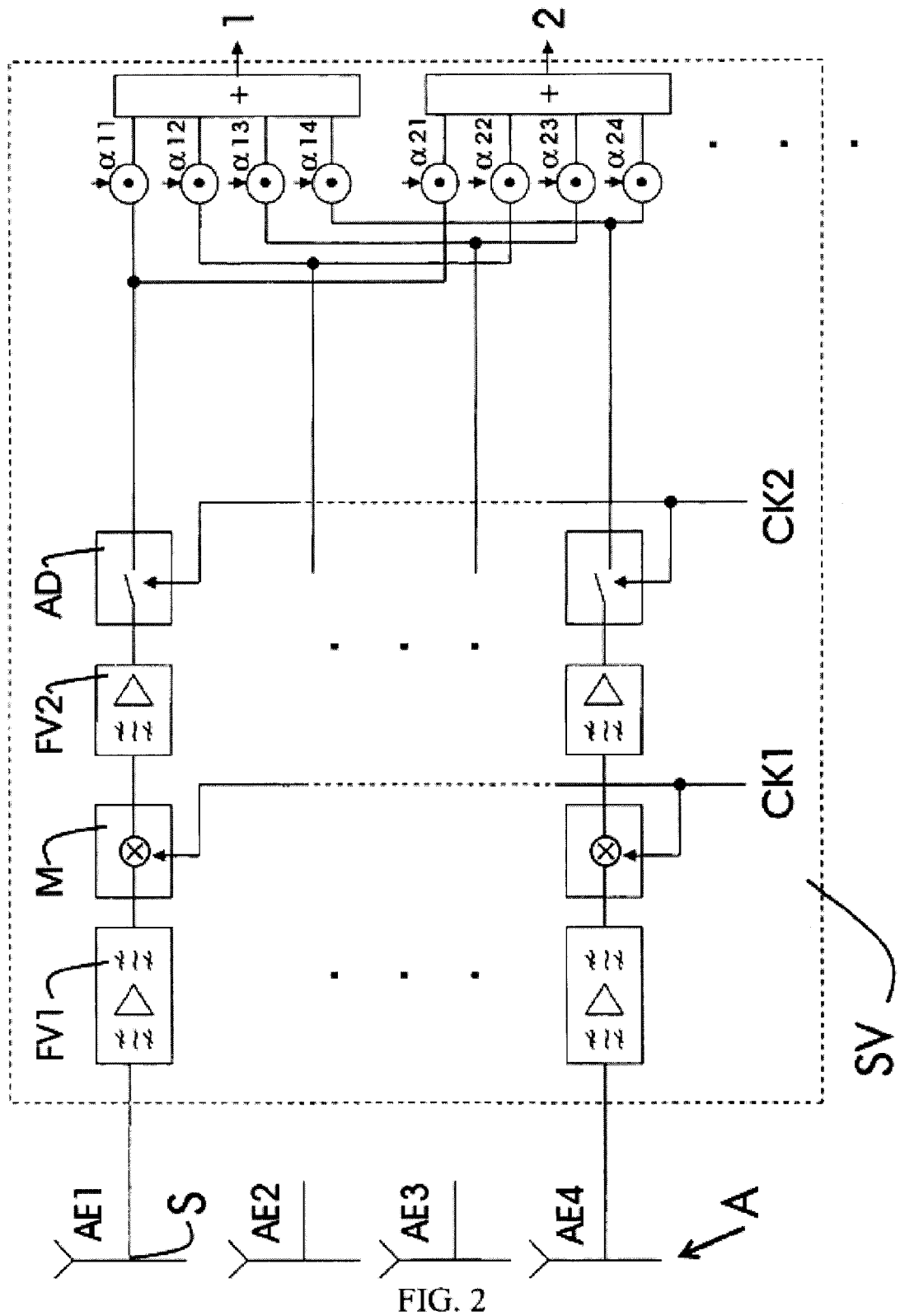
Figure 4:
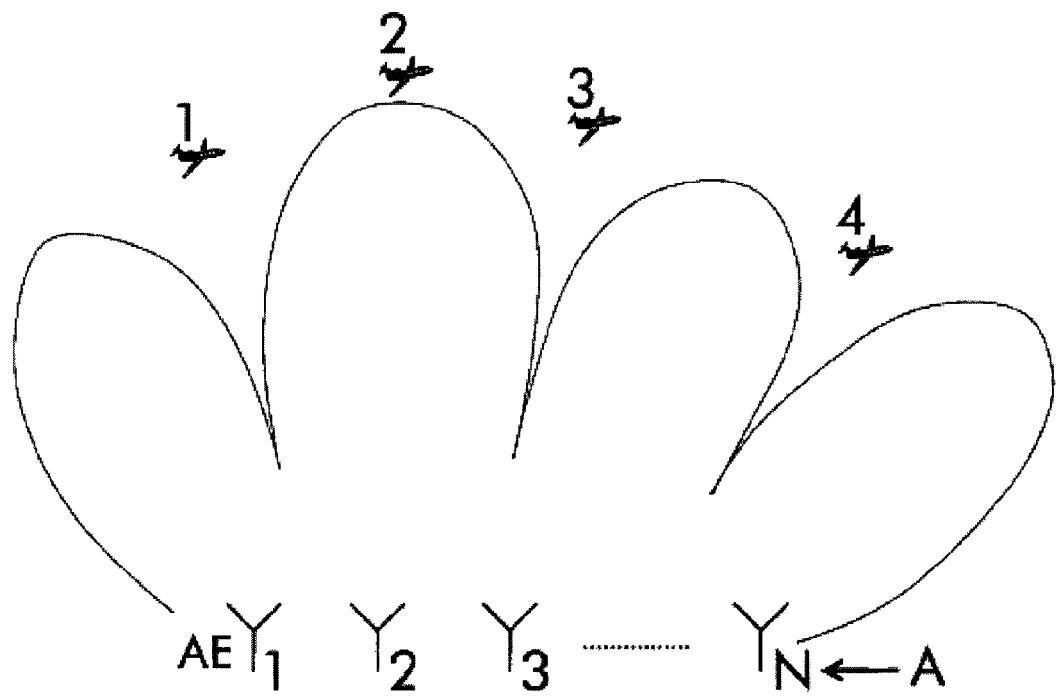
Figure 5:
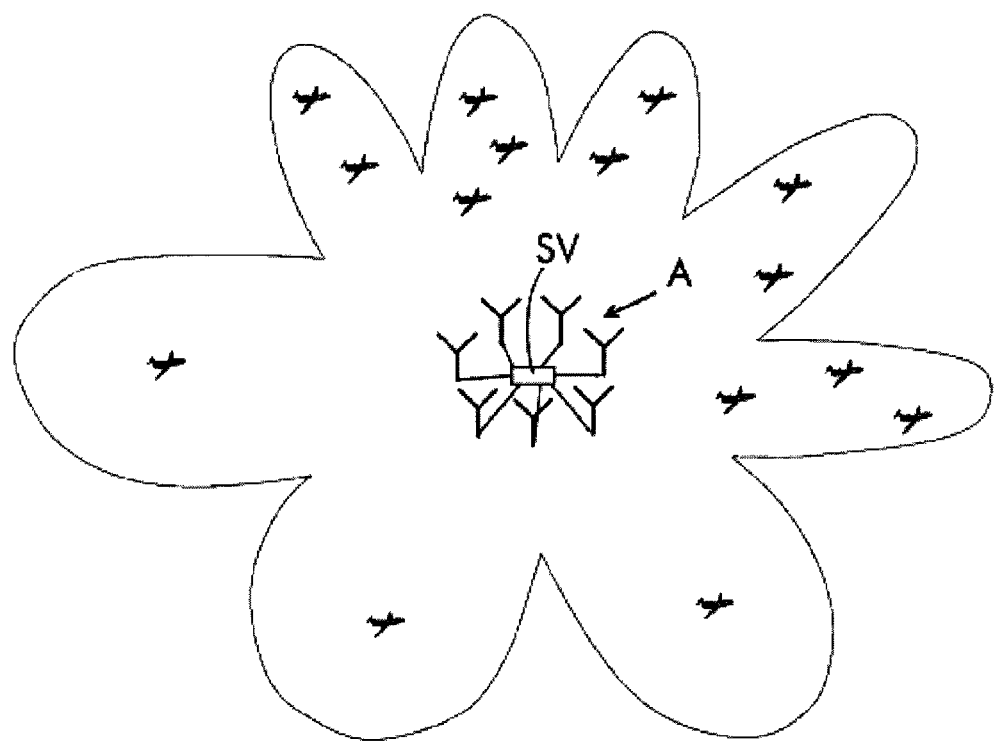
Figure 6:
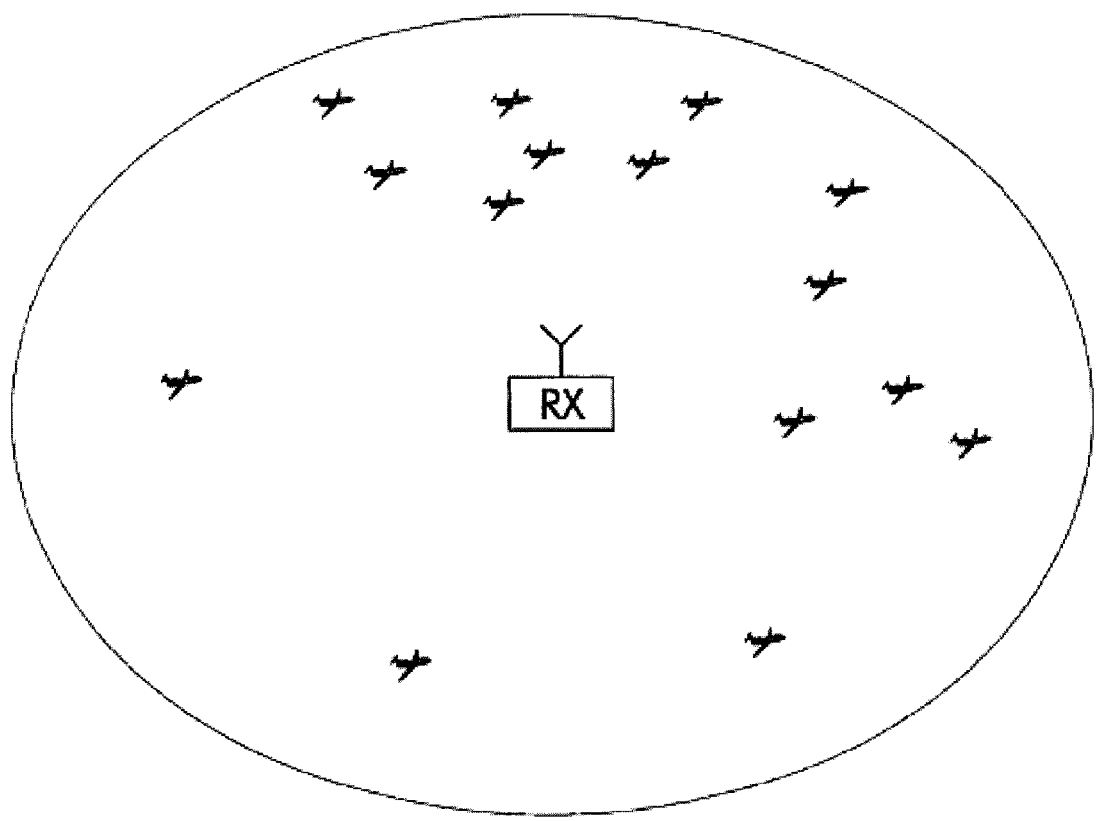
Figure 7:
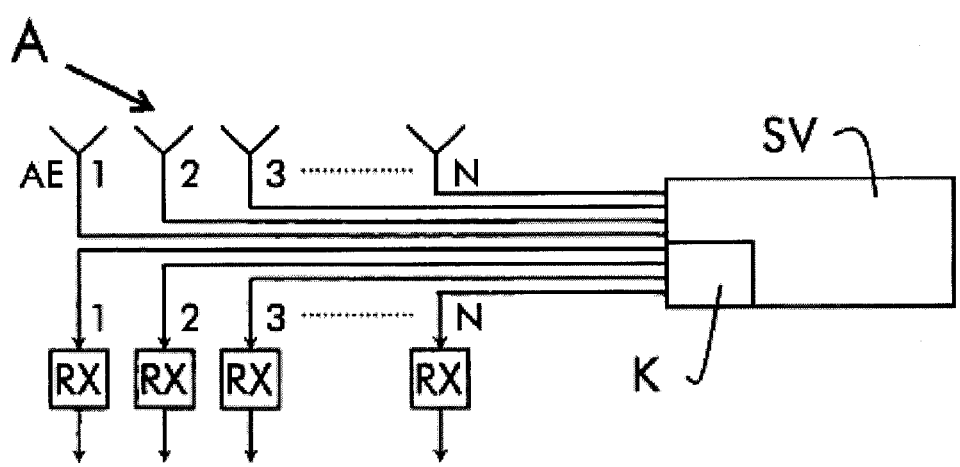
Figure 8:
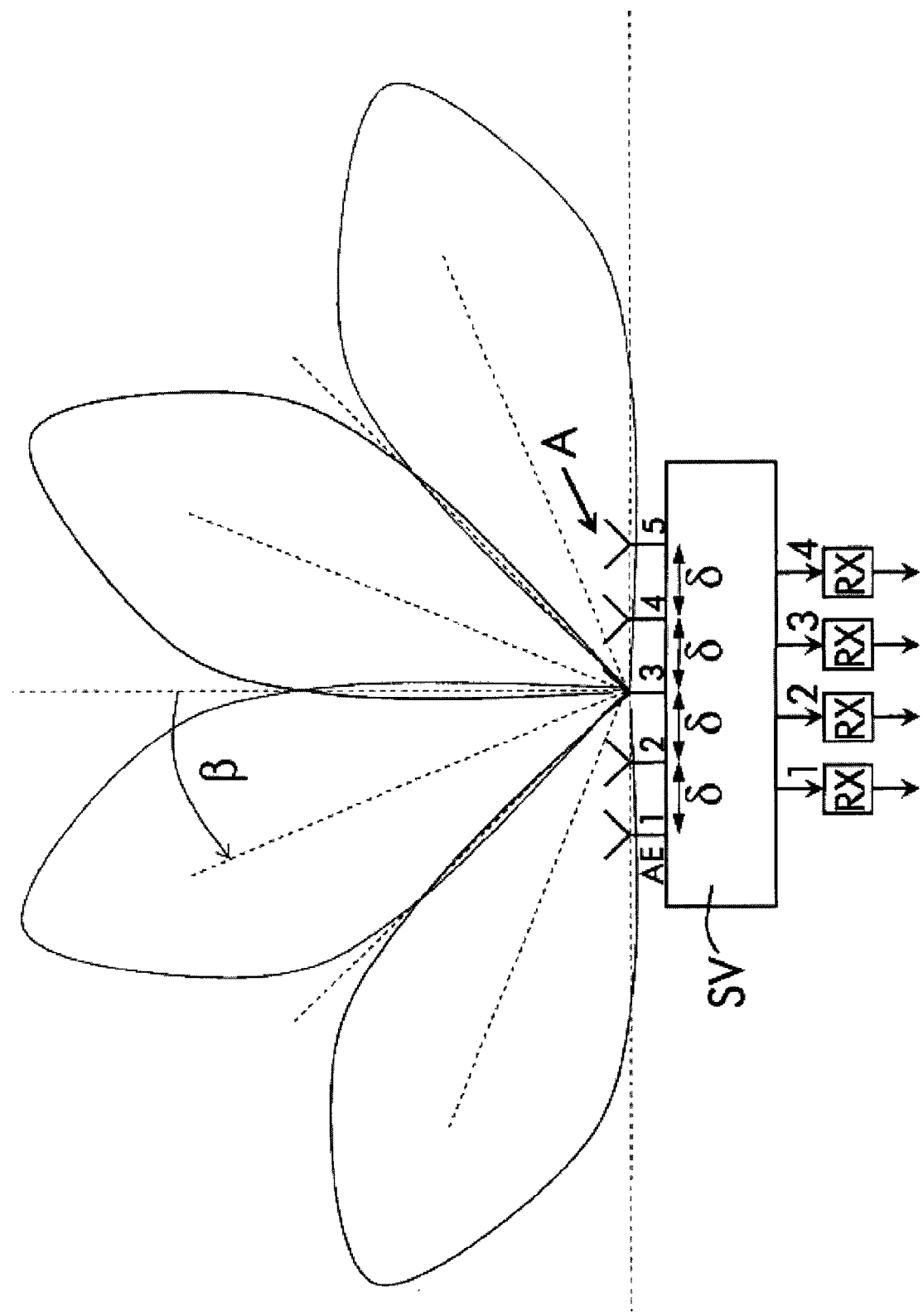
Figure 9:
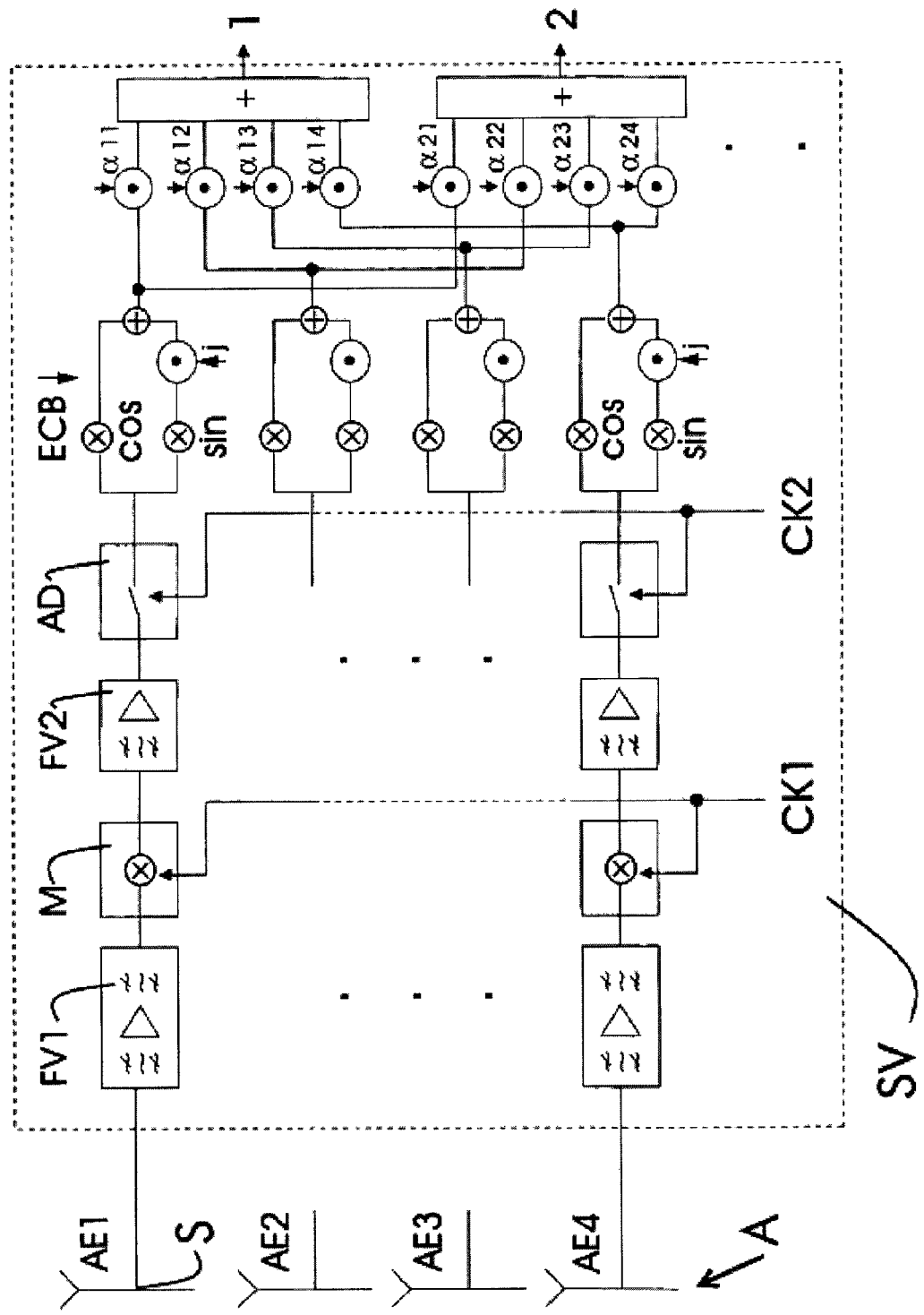
Figure 10:
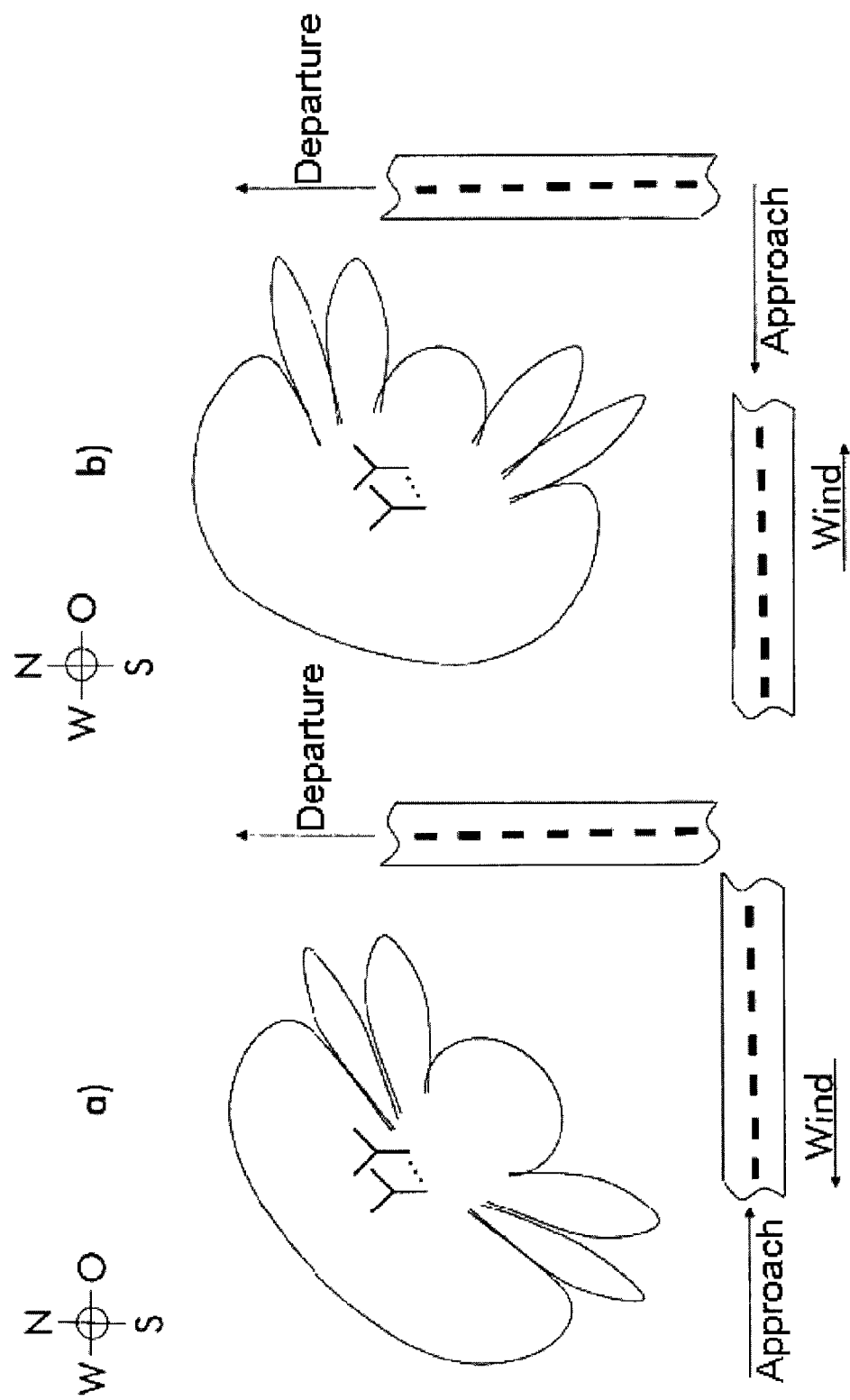

Other advantages and details can be seen in the below description of preferred embodiments of the invention and the accompanying drawings. The drawings show:

FIG. 1 the principle of a device for multi-antenna reception with a receiving diagram having three lobes, FIG. 2 as an example an embodiment of signal processing for sectoring with a receiver having four antennas and two sectors, FIG. 3 a configuration of a directional characteristic with a coefficient set and blanking of interfering transmitter D, FIG. 4 a configuration of a directional characteristic and blanking of several interferers, FIG. 5 as an example a configuration of sectoring with circular antenna assembly, FIG. 6 a configuration of a receiving characteristic according to the state of art, FIG. 7 an implementation form for integration into existing individual receiver systems, FIG. 8 as an example a coefficient creation of a uniform, linear antenna array, FIG. 9 another implementation form for signal processing, according to FIG. 2, using ECB-signals processing and, FIG. 10 shows an example of a quasi-dynamic adaptation of sectors within an airfield area.

The secondary radar at 1090 MHz is used to identify and transmit general flight and flight safety data between aircraft and terrestrial vehicles. FIG. 1 shows the principle of a device for multi-antenna reception with a receiving diagram having three lobes. In quasi dynamic or dynamic sectoring of the controlled space, the secondary radar system has at least one N element of the antenna AE1, 2, 3, . . . , one N existing dislocation of the A antennas for reception of dispatched secondary radar signals; one next to the connection point to the given antenna element AE1, 2, 3, . . . ; an N connecting unit for signal processing SV with couple matrix K with adjustable coefficients ($\alpha_{11}, \alpha_{12}, \ldots, \alpha_{21}, \alpha_{22} \ldots$, see FIG. 2) for sectoring of the controlled space through the conversion of signals from the antenna and at least one connected with the couple matrix K receiver (m=1, 2, . . . ). According to the example with three lobes presented in FIG. 1 "offered" to the actual units of receivers RX1, . . . , RX3 are signals that correspond to the pertaining coefficient rates, upon which a management device that is not present in the figures directs the connection points ($\alpha_{11}, \alpha_{12}, \ldots, \alpha_{21}, \alpha_{22}, \ldots$, see FIG. 2) to the couple matrix K (for example, $\alpha_{11}=1$ corresponds to a "switched" or $\alpha_{11}=0$ corresponds to "muting", $\alpha_{11}>1$ corresponds to "amplification"), respectively, switches the way of the antenna signals through the couple matrix K and through at least of one summing/additional switch(es) to the transmitter(s). The summing/additional transmitter may be located externally located to the terminals of the couple matrix K or integrated in the couple matrix K. The same is valid for the damping devices, respectively, for the amplifiers, which are integrated in the connection point of the connection matrix K. The individual virtual sectors are designated with 1, 2, . . . in FIG. 2.

FIG. 2 shows as an example an embodiment of signal processing for sectoring with a receiver having four antennas and two sectors. The signal processing unit SV comprises modules in following subsequent order:

a first linear amplifier FV1 and bandpass filter FV1 combination for amplifying and band limitation of said received secondary radar signal connected to said connection point (S) of the respective antenna element AE1, 2, 3, . . . , N, a mixer M connected to said first amplifier-bandpass filter combination FV1 for a frequency conversion into a ZF-range, a second linear amplifier FV2, connected to the mixer exit, for amplifying the signal in the ZF-range, an analog-to-digital converter AD connected to the second linear amplifier FV2 for sampling and quantization of its input signal and said couple matrix K connected with the analog-to-digital converter AD for sectoring of the space to be monitored their coefficient $\alpha_{11}, \alpha_{12}, \ldots, \alpha_{21}, \alpha_{22} \ldots$ are adjustable by means of a control or a setting of parameters.

Preferred the secondary linear amplifier FV2 has a bandpass filter for band limiting of the signal in the intermediate frequency band.

For an embodiment, not shown in FIG. 2, the signal processing unit SV comprises at least modules in following subsequent order:

a first linear amplifier and bandpass filter FV1 combination for amplifying and band limitation of said received secondary radar signal connected to said connection point (S) of the respective antenna element AE1, 2, 3, . . . , N, A mixer connected to said first amplifier-bandpass filter combination FV1 for a frequency conversion into a complex baseband, An analog-to-digital converter AD connected to said mixer for sampling and quantization of its input signal and said couple matrix K connected with the analog-to-digital converter AD for sectoring of the space to be monitored their coefficient $\alpha_{11}, \alpha_{12}, \ldots, \alpha_{21}, \alpha_{22} \ldots$ are adjustable by means of a control or a setting of parameters.

FIG. 2 shows as an example an embodiment of signal processing for sectoring with a receiver having four antennas and several sectors (in FIG. 2: 2). The signal of the antenna A here originally is filtered and amplified in FV1 before mixing it with mixer M at an interim frequency. After further filtering of the interim frequencies and amplification in FV2, the analog-to-digital conversion of the signals in the AD is being performed. To avoid the differences in the frequency and phase in the analog processing of the signal, for mixing of the entire signal of the antennas, a mixing oscillator CK1 is being used. Besides, all ADC are supplied with a central generator for reproducing the CK2 frequencies. To process the signal from sector 1, the signals $x_1, x_2, x_3$ and $x_4$ are evaluated further with coefficients $\alpha_{11}, \alpha_{12}, \alpha_{13}$ and $\alpha_{14}$. Analogically, to process the following sectors m (m=2, 3, 4, . . . ) with coefficients $\alpha_{m1}, \alpha_{m2}, \alpha_{m3}, \alpha_{m4}$.

FIG. 9 shows another implementation form for signal processing using ECB signals. After the analog digital transformation of the AD signals, there follows the (digital) mixing into ECB and a low-frequency filtration (a low-frequency filter is not displayed in FIG. 9). FIG. 9 shows a digital mixing of all antenna signals, during which identical mixing tables are used (for sin, cos) and within the framework of the discovery, other mixers for the processing of ECB signals $x_1, x_2, x_3$ and $x_4$ can be used.

FIG. 3 shows an example for forming the receiving characteristic of a virtual sector, upon which the coefficients of the couple matrix are selected in such a way that for signals coming from the interferer D, a cancelling or at least a muting has been realized. This cancelling of signal from a certain direction has been also named as appropriate placing of zeros in the direction characteristic.

FIG. 4 shows another example for the virtual sector reception feature, with which through another selection of linking coefficients the cancelling of more objects 1, 3 and 4 is being achieved when receiving object 2. In compliance thereof, compared to FIG. 3 more zeros are available in the direction characteristic.

FIG. 5 and FIG. 6 explain what advantage has been achieved with the virtual sectoring in terms of generating sufficient probability for conversion of signals from different senders. Both FIG. 5 and FIG. 6 in the space around the receiver, a number of senders are being located and in both figures an equal allocation has been accepted.

FIG. 6 shows the receipt situation according to the state of the art with the use of one receiving antenna with a radio-receiving feature. Through this omnidirectional reception, the signals of all too many senders can be conversely converted since all reviewed senders are located in the field of receiver reception.

FIG. 5, to the opposite, displays an example for forming a sector allocation (here with 8 sectors) with different density of the senders in the various space dimensions with the use of circular antenna arrangement. As can be noted, in the various sectors only several senders are located, due to which the probability for conversions is radically reduced. After this, in FIG. 5 it is seen that the flexible opportunity to form the individual virtual sectors is used in a way that the size of the sectors is adapted in the available in the given field of the space sender density. Upon non-identical sender allocation and an equal number of sectors, the conversion option has been reduced once again. In the reviewed use by the receiver of secondary radar signals such non-identical allocation is even a rule.

FIG. 7 shows the subsequent integration into an existing system with individual channel receivers, upon which the given signal network between an antenna and a receiver has been divided and the signal processing unit is intermediately commuted, through which the preliminary processing of the delivered antenna signals is being realized through the use of the connection matrix and through that—the realization of the allocation into sectors and the equipotent signals are again delivered into the individual channel receivers.

FIG. 8 shows the formation of the coefficients to the example for identical linear antenna arrays (ULA: Uniform Linear Array) under the surveillance/supervision of only one half plane through 4 permanent equal sectors (note: for the simplified presentation of just one half plane here, one draws on the fact that the antennas based on their mechanical construction are screened against other half planes).

The equation $$Y = K^T X,$$

describes the interaction/coupling between the antenna signals and the received thereof sector signals for the individual receivers. In addition X is the matrix of the individual antenna signals (for example, of the pertaining ECB signals), Y is the matrix of the output signals for the individual sectors/receivers and $$K = [k_1 k_2 k_3 \ldots k_M]$$

the couple matrix with individual connecting vectors $$k_m = [\alpha_{m1} \alpha_{m2} \ldots \alpha_{mN}]^T$$

for the formation of N antenna signals in sector m (m=1, 2, ..., M), comprising of coefficients $\alpha_{mn}$. The coefficients are calculated, for example, with the constructive conversion of the falling wave front.

As an example, here the coefficients are cited for the special dislocation of the antennas at a distance half the wavelength, i.e. $\delta = \lambda/2$. Besides, the couple matrix shows $$K = \begin{pmatrix} 1 & 1 & 1 & 1 \\ e^{j\pi \sin(\beta_1)} & e^{j\pi \sin(\beta_2)} & e^{j\pi \sin(\beta_3)} & e^{j\pi \sin(\beta_4)} \\ e^{j2\pi \sin(\beta_1)} & e^{j2\pi \sin(\beta_2)} & e^{j2\pi \sin(\beta_3)} & e^{j2\pi \sin(\beta_4)} \\ e^{j3\pi \sin(\beta_1)} & e^{j3\pi \sin(\beta_2)} & e^{j3\pi \sin(\beta_3)} & e^{j3\pi \sin(\beta_4)} \\ e^{j4\pi \sin(\beta_1)} & e^{j4\pi \sin(\beta_2)} & e^{j4\pi \sin(\beta_3)} & e^{j4\pi \sin(\beta_4)} \end{pmatrix}.$$

where $\beta_i$ is the impinging angle of the given Beam.

In addition to this example, additional receivers may be added to a dynamic system whose Beams would be dynamically directed to our object of interest. One system that conforms to the invention is connected in a standard way within a broad general system (for example, for the control of the air space). If compared to other mechanisms, respectively, partial systems in this general system (multilateration, estimation of the direction (angle measurement), ADS-B (GPS-coordinates), (primary) radar, etc.), the approximate objects' positions in the reviewed space are known, this knowledge can be used through the central signal processing unit to monitor the Beam/s and/or to adapt the form of the Beam (for example, for setting zeros so as to fade out (harmful) objects), where the coefficient of the given Beam(s) is being dynamically adapted.

FIG. 10 shows an example for quasi dynamic adaptation of the sectors for an airfield with a single take-off line and one line for landing. The direction for aircraft stopping and landing is being adapted for the landing process to the actual wind direction, where aircraft approaches for landing from the left in the one case, respectively, from the west (partial image a) and in the other case from the right, respectively, from the east (partial image b). In connection with that, the control-relevant areas change, too. In partial image b, most flying movements happen, from the point of view of the control system, in the eastern direction so that in this direction a higher resolution is necessary—respectively, separation in a higher number of sectors—whereas in the western direction the number of sectors is sufficient. In partial image a, however, more flying movements happened in the western direction due to which the movement of the virtual sectors happens in this direction.

Since the wind direction changes only relatively slowly and, respectively, the flying direction often (usually for many hours) remains unchanged for a long period of time, in the easiest case the virtual control sectors can remain constant during this period and, for example, only upon a new change of the landing direction a reverse sectoring switch from case a to case b may be undertaken.

The presented invention may be used also in combination with the not earlier published German patent application 10 2008 010 882.0-55 in the name of the present applicant, which refers to a device and method for the evaluation of the direction from secondary radar signals.

To form a radio-based navigation system in a way such, on the one hand, the evaluation of the direction and/or, on the other hand, the decoding of the secondary radar signals is possible, the device comprises:

at least one array comprising M antenna elements, a low noise linear amplifier and bandpass filter combination connected to a plug-in connector of the respective antenna element, at the filter output of said combination a first linear amplifier being connected for amplifying the band-limited signal, a first bandpass filter connected to the low noise linear amplifier, to whose filter output a linear amplifier for amplifying of the signal limited in the band is connected, a mixer connected to the first linear amplifier for the frequency conversion into a ZF region, a second linear amplifier and bandpass filter combination connected to the mixer output for amplifying and limiting the bandwidth of the signal in the ZF region, a first analog-to-digital converter connected to the second bandpass filter for scanning and quantifying the filter output signal, a configurable signal processor connected to the first analog-to-digital converter, said processor being connected to a PLL-VCO circuit for controlling the mixer frequency and receiving the data for processing, a processing unit connected to the configurable signal processors, said unit collecting the data from all antenna elements and carrying out the directional estimation by means of a method based on a subspace, whereby the various gains, phase differences and coupling of antenna elements in the analog input devices connected to the M antenna elements to be taken into account both in estimating the direction and in the detection of the received radio data.

The non-earlier published German patent application 10 2008 010 882.0-55 in the name of the present applicant, presents a method for a secondary radar system, with at least one array comprising M antenna elements and connected to the M antenna elements analog input devices with linear amplifiers, band filters, a mixer, analog-to-digital converters, configurable signal processors and a processing unit, said method solves the problem of estimation of the direction and/or of decoding of secondary radar signals, whereby:

generating by one of the signal processors first and second clock signals as a normal time for the mixer and analog-to-digital converter, applying a coherent analog and digital signal processing in the processing unit connected to the signal processors, which collects data from all antenna elements and makes an estimation of the direction by a method based on a subspace and taking into account various gains, phase differences and coupling of antenna elements in the analog input devices connected to the M antenna elements both in estimating the direction and in detecting of the received radio data.

A technical novelty in consideration of prior art is the following:
- The use of the secondary radar equipment;
- Dynamic adaptation of the Beam forms (through coefficient adjustment) in the operation (instead of static configuration).

Advantages versus prior art are:
- The system facilitates the dynamic regulation of aircraft congregation in a certain spatial zone;
- Interfering signals from aircraft or other interferers may be faded out (whereas systems according prior art are blind in this sector);
- Fading out of multiple path propagation (reflections) is possible, where the respective directions of space may be faded and the detection be approved;
- In principle, it is possible also to use multiple path propagation constructively; for example, for the detection of signals from an aircraft whose direct path is hard to separate from an overlaying interferer, the direct path and therefore the interferer could have been faded and instead of this a reflection path of the sender would be focused and applied. This is being implemented within the framework of the invention.

The invention is not limited to the described and presented examples of implementation, but it also covers all implementations being equivalent in the sense of the invention. For example, in the context of the invention, the criteria for coefficient regulation, the following may be implemented:
- Optimization of the signal-interference ratio through adaptive regulation of the coefficients;
- Maximization of the amplitude of the useful signal.

Furthermore signal processing may be undertaken as follows:
- Conversion into ECB;
- Presentation of the N antenna signals as a vector;
- Vector-matrix multiplication of the signal vector with the couple matrix;
- Division/fragmentation of the output vector into M signals from receivers;
- The invention is principally valid for all types of secondary radar signals (presently, these are: types S/A/C, as well as Squitter/ADS-B).

Furthermore "Spatial garbling decoding" can also be implemented with the division into horizontal sectors; sectoring can also be determined once and then not to monitor it dynamically, the couple matrix K may be built in a cascade fashion, the couple matrix K may be configured and/or diagnosed remotely, etc. Besides, the invention has so far not been limited by the defined combination of claimed features according to patent claim 1 or 12 and can also be defined through any other combination of certain features of all disclosed individual features. This means that each individual feature according to patent claim 1 or 12 may be omitted, respectively, at least to be replaced by an individual feature disclosed at another place in this application.

The invention claimed is:

1. A device for the receiving secondary radar signals and for the quasi-dynamic or dynamic sectoring of a space to be monitored, which comprises:
   at least one antenna assembly (A) comprising N antenna elements (AE1, 2, 3, ..., N) for the reception of transmitted secondary radar signals,
   a signal processing unit (SV) connected via a connection point (S) to the respective antenna elements (AE1, 2, 3, ..., N) for the joint processing of all received antenna signals, said signal processing unit (SV) having a couple matrix (K) with adjustable coefficients ($\alpha_{11}, \alpha_{12}, \ldots, \alpha_{21}, \alpha_{22} \ldots$) for sectoring of the space to be monitored and performing a superposition of the antenna signals by means of a multiplicative-additive combination of said received antenna signals,
   outputs associated with the couple matrix (K) for connection to individual receivers, and
   at least one receiver m (1, 2, ..., M) connected to said couple matrix (K), wherein according to a dynamic sectoring of the space each receiver m (m =1, 2, ..., M) receives for each receipt telegram another weighted superposition of the antenna signals with certain couple coefficients ($\alpha_{11}, \alpha_{12}, \ldots, \alpha_{21}, \alpha_{22} \ldots$), and whereby in the case of quasi-dynamic sectoring the adjustable coefficients ($\alpha_{11}, \alpha_{12}, \ldots, \alpha_{21}, \alpha_{22} \ldots$) are fixed over a longer time period.

2. The device according to claim 1, wherein said signal processing unit (SV) comprises modules in following subsequent order:
   a first linear amplifier (FV1) and bandpass filter (FV1) combination for amplifying and band limitation of said received secondary radar signal connected to said connection point (S) of the respective antenna element (AE1, 2, 3, ..., N),
   a mixer (M) connected to said first amplifier-bandpass filter combination (FV1) for a frequency conversion into a ZF-range,
   a second linear amplifier (FV2), connected to the mixer exit, for amplifying the signal in the ZF-range, and
   an analog-to-digital converter (AD) connected to the second linear amplifier (FV2) for sampling and quantization of its input signal, and
   wherein the couple matrix (K) is connected with the analog-to-digital converter (AD) and wherein the adjustable coefficients ($\alpha_{11}, \alpha_{12}, \ldots, \alpha_{21}, \alpha_{22} \ldots$) are adjustable by means of a control or a setting of parameters.

3. The device according to claim 2, wherein said second linear amplifier (FV2) comprises a bandpass filter for the band limitation of the signal in the ZF-range.

4. The device according to claim 1, wherein said signal processing unit (SV) comprising modules in following subsequent order:
   a first linear amplifier (FV1) and bandpass filter (FV1) combination for amplifying and band limitation of said received secondary radar signal connected to said connection point (S) of the respective antenna element (AE1, 2, 3, ..., N),
   a mixer (M) connected to said first amplifier-bandpass filter combination (FV1) for a frequency conversion into a complex baseband,
   an analog-to-digital converter (AD) connected to said mixer (M) for sampling and quantization of its input signal and
   wherein the couple matrix (K) is connected with the analog-to-digital converter (AD) and wherein the adjustable coefficients ($\alpha_{11}, \alpha_{12}, \ldots, \alpha_{21}, \alpha_{22} \ldots$) are adjustable by means of a control or a setting of parameters.

5. The device according to claim 4, wherein between mixer (M) and analog-to-digital converter (AD) an amplifier-filter combination (FV2) is arranged.

6. The device according to claim 2, wherein between the analog-to-digital converter (AD) and the couple matrix (K) a digital mixer (ECB) for digital frequency conversion of the supplied ZF-signals in the equivalent complex baseband is arranged.

7. The device according to claim 1, wherein said antenna assembly (A) is formed as a linear or circular array or as a matrix arrangement.

8. The device according to claim 1, wherein said antenna assembly (A) is formed with antenna elements (AE1, 2, 3, ..., N) in multidimensional arrangement to each other.

9. The device according to claim 8, wherein for the sectoring of the space both in horizontal and in vertical sectors the antenna assembly (A) includes horizontal and vertical arranged antenna elements (AE1, 2, 3, ..., N).

10. The device according to claim 1, wherein for the subsequent integration in existing systems with single channel receivers the respective signal path between antenna and receivers is separated and the signal processing unit (SV) is intermediated, thus the preprocessing of the supplied antenna signals and the division in sectors is realized by the application of the couple matrix (K) and the disposal again of the resultant signals to the single channel receivers.

11. The device according to claim 1 wherein the control focuses instead to the direct path to a reflection path of the transmitted secondary radar signals, whereby a use of multipath propagation is possible.

12. A method for the quasi-dynamic or dynamic sectoring of a space to be monitored using a device for the reception of secondary radar signals comprising at least an antenna assembly (A) comprising N antenna elements (AE1, 2, 3, ..., N) for the reception of secondary radar signals of objects, a signal processing unit (SV) with a couple matrix (K) connected to said antenna assembly (A) and at least one receiver m (1, 2, ..., M) connected to said couple matrix (K), the method comprising:

determining of coefficients ($\alpha_{11}, \alpha_{12}, \ldots, \alpha_{21}, \alpha_{22} \ldots$) of the couple matrix (K) quasi dynamic by setting of parameters or dynamic in the operation mode and in accordance with condition of the useful signal of an interesting object in a sector and/or by consideration of optionally present interfering signals, and making available to the receiver m (m=1, 2, ..., M) by the couple matrix (K) in each case one with a certain couple coefficient ($\alpha_{m1}, \alpha_{m2}, \ldots, \alpha_{mN}$) weighted superposition of the signals by means of a multiplicative-additive combination of said received antenna signals, whereby in the dynamic sectoring of the space to be monitored the receiver m can receive for each receipt telegram another with certain couple coefficient ($\alpha_{m1}, \alpha_{m2}, \ldots, \alpha_{mN}$) weighted superposition of the antenna signals and whereby in the quasi-dynamic case the adjustable coefficients ($\alpha_{11}, \alpha_{12}, \ldots, \alpha_{21}, \alpha_{22} \ldots$) are fixed over a longer time period, wherein in the case of M receivers (1, 2, ..., M) each receiver m ($\alpha_{m1}, \alpha_{m2}, \ldots, \alpha_{mN}$) receives another combination of couple coefficient ($\alpha_{m1}, \alpha_{m2}, \ldots, \alpha_{mN}$) said coefficients ($\alpha_{11}, \alpha_{12}, \ldots, \alpha_{21}, \alpha_{22} \ldots$) being selected in such a manner that for each receiver (1, 2, ..., M) a certain sector of the space to be monitored becomes focused, wherein the sector is either a single continuous space or a combination of several spaces, and wherein the dynamic adaptation of the beam is made by adaptation of the coefficients ($\alpha_{11}, \alpha_{12}, \ldots, \alpha_{21}, \alpha_{22} \ldots$).

13. The method according to claim 12, wherein the optimization of the beam is made in such a manner that the maximum of the beam lies over the interesting object for the respective receiver, where possible.

14. The method according to claim 12, wherein the zeroes of the beam are placed over objects to be faded out.

15. The method according to claim 13, wherein either static sectors or sectors, which are adjusted dynamic in accordance with the current requests, are formed.

16. The method according to claim 12, wherein the combination of the signals associated to the antenna elements (AE1, 2, 3, -. ..., N) takes place in the signal processing unit (SV) on basis of ECB signals or HF-signals or ZF-signals.

17. The method according to claim 12, wherein the antenna elements (AE1, 2, 3, ..., N) are in multidimensional arrangement to each other, and wherein a sectoring of the space in horizontal sectors and/or a vertical division of the space is done in accordance with various elevation angles.

18. The method according to claim 12, wherein one or several disturbers or interfering signals caused by reflections are faded out in a specific manner.

* * * * *

UNITED STATES PATENT AND TRADEMARK OFFICE
CERTIFICATE OF CORRECTION

PATENT NO. : 8,462,041 B2  
APPLICATION NO. : 13/131669  
DATED : June 11, 2013  
INVENTOR(S) : Hampel et al.

Page 1 of 1

It is certified that error appears in the above-identified patent and that said Letters Patent is hereby corrected as shown below:

In the Claims:

Column 16, Line 33, Claim 2, delete "adiustable" and insert --adjustable--.

Column 16, Line 34, Claim 2, delete "adiustable" and insert --adjustable--.

Column 16, Line 54, Claim 4, delete "adiustable" and insert --adjustable--.

Column 16, Line 55, Claim 4, delete "adiustable" and insert --adjustable--.

Signed and Sealed this  
Thirteenth Day of August, 2013

Teresa Stanek Rea  
*Acting Director of the United States Patent and Trademark Office*